Patented Nov. 5, 1935

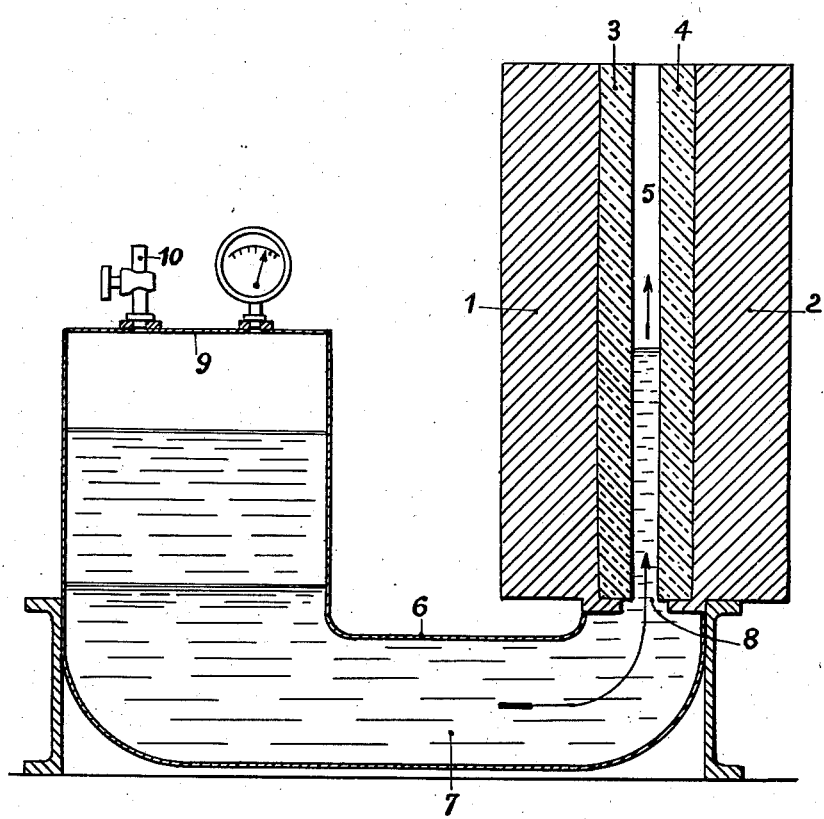

2,020,178

UNITED STATES PATENT OFFICE 2,020,178

METHOD OF AND APPARATUS FOR THE MANUFACTURE OF SAFETY GLASS

Jean Haas, Paris, France, assignor to Société Générale d'Optique Société Anonyme des Anciens Etablissements Huet & Cie et Jumelles Flammarion, Paris, France Application December 15, 1933, Serial No. 702,639
In France December 20, 1932

4 Claims. (Cl. 49—81.5)

The present invention has for its object an improved method of and apparatus for permitting the introduction between two sheets or plates of glass, which may be of any form and be arranged either parallel to one another or not, of a more or less viscous transparent liquid, more especially for the manufacture of glass of the kind known as "safety glass".

The improved method consists essentially in introducing the viscous liquid between the two sheets of glass by the aid of a difference of pressure and preferably by forcing it from below upwards between the two sheets, which ensures perfect filling of the space included between the said sheets, thus avoiding the formation of bubbles or other defects.

The apparatus for carrying this method into practice comprises supports for the said sheets of glass, such supports maintaining the sheets of glass in position at the desired distance apart and if desired ensuring the closure of the vertical sides of the space between the sheets, but leaving open this space at its base. This supporting means is combined with a closed reservoir, which contains the liquid and in which a pressure can be exerted to force forward the liquid, that passes out through an elongated aperture opening between the supports of the sheets of glass.

In order that the invention may be better understood, there is shown in the accompanying diagrammatic drawing, given by way of example only, one constructional form of the novel apparatus.

As can be seen from this drawing the apparatus comprises frames 1 and 2, serving to maintain in a suitable position the sheets of glass 3 and 4, in such a manner that there is left between them a space 5 of predetermined thickness.

These frames are combined with a reservoir 6 containing the viscous liquid 7 which is to be introduced between the sheets of glass. This reservoir is completely closed except for an aperture 8 which is arranged to register with the space 5.

This reservoir is covered by a plate 9, which bears a branch 10 serving for the introduction of air or gas under pressure, and which also receives the instruments required for controlling the pressure.

The transparent material is brought to a suitable degree of viscosity; it may also be such that after its introduction between the sheets of glass, its viscosity increases and it may even solidify.

A modified form of carrying the method into practice consists in causing the introduction of the liquid between the sheets of glass to take place not by pressure but by suction. In this case, the sides and the upper border of the space 5 should be hermetically closed.

The two means, suction and pressure, can also be used in conjunction.

The above arrangements are only given by way of example; all the details of construction, the forms, dimensions and materials employed can be varied in all cases without departing from the nature of the invention.

I claim:

1. A method of introducing a more or less viscous material into a space between two sheets or plates of glass, including the step of moving the material into this space by a difference of pressure with the movement of the material taking place from below upwards.

2. A method of introducing a more or less viscous material between two sheets or plates of glass, consisting in arranging the sheets in a vertical position and suitably spaced apart, closing the spaces between the vertical sides of the plates, and moving the viscous liquid upwardly and between the sheets to avoid the formation of air bubbles.

3. A method as claimed in claim 2, in which the upward displacement of the viscous material is effected by a delivery obtained by a fluid pressure applied to the surface of the said material.

4. An apparatus of the character described, comprising a closed reservoir for viscous liquid provided with an aperture adjacent one end, means on the reservoir above the aperture for supporting sheets of glass in vertical spaced relation with the space registering with the aperture, and a supply of fluid under pressure in the other end of the reservoir for producing the delivery of the liquid through the said aperture and upwardly between the plates.

JEAN HAAS.